United States Patent Office 3,097,132
Patented July 9, 1963

3,097,132
FUNGICIDAL PLANT PROTECTION
Christian Wiegand, Wuppertal-Elberfeld, and Ferdinand Grewe, Cologne-Stammheim, Germany, assignors to Farbenfabriken Bayer Aktiengesellschaft, Leverkusen, Germany, a corporation of Germany
No Drawing. Filed Oct. 4, 1960, Ser. No. 60,289
Claims priority, application Germany Oct. 10, 1959
6 Claims. (Cl. 167—33)

The present invention relates to and has as its objects new and useful fungicidal plant protecting agents and methods of combating fungi therewith. The compounds which were found to be of value to destroy damaging fungi of plants may be represented by the following general formula:

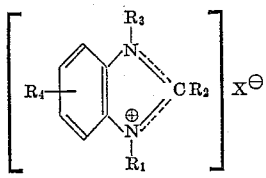

in which $R_1$ and $R_2$ stand for lower alkyl radicals, $R_2$ may also be hydrogen, $R_3$ stands for a higher alkyl radical and $R_4$ stands for possible substituents of the benzene nucleus, X is a salt-forming ion which renders the whole molecule water-insoluble or difficultly soluble in water.

It is known that water-soluble salts of 1-methyl-2-phenyl-3-dodecylbenzimidazole can be used as disinfecting agents with fungicidal or bactericidal action. (See, e.g., German Patent 1,040,752.)

Furthermore it is known from U.S. Patent 2,782,204 that certain 1,3-di-higher-alkyl-benzimidazoline-bromides possess fungicidal properties which make them useful in the field of disinfection. It is also known from J. Pharm. Soc. Japan, vol. 63 (1943), pp. 593–559, that certain 1-higher-alkyl-3-lower-alkyl-benzimidazoline salts may be used as inert soaps and that some of the compounds mentioned in the aforementioned journal also possess bactericidal action useful in the field of disinfection.

All these compounds, however, were as yet not used for the protection of living plants, because they damage them or because their effect is only of short duration.

In accordance with the present invention it has been found that insoluble salts of 1-lower alkyl-3-higher alkyl-benzimidazoles, even the salts of hydrohalic acids, are usable for the treatment of living plant cultures. In cold water these last mentioned salts are also only difficultly soluble.

Besides the aforementioned hydrohalic acid salts, salts of other acids are naturally also suitable which are difficultly soluble or insoluble in cold water.

Most specifically compounds of the above said formula are useful against fungicidal attack in which the ion X is chloride, bromide, sulfate, nitrate and the like. More complex ions very useful for the above described invention are:

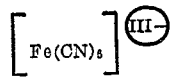

Hexacyanoferrate

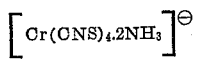

Reineckate

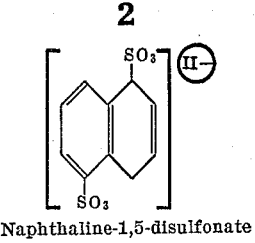

Naphthaline-1,5-disulfonate

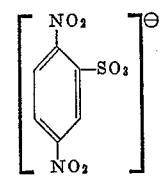

(Di)-nitrophenyl-sulfonate

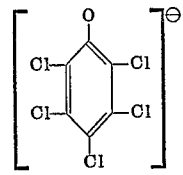

Pentachloro-phenate

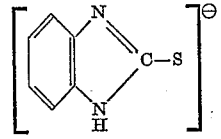

2-mercapto-benzimidazolate

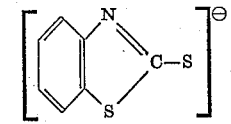

2-mercapto-benzothiazolate and other similar groups which render the above shown lower alkyl, higher alkyl benzimidazoles difficultly water-soluble or water-insoluble.

The groups $R_1$–$R_4$ of the formula of the beginning of this application more specifically are:

$R_1$ and $R_2$ lower alkyls up to 4 carbon atoms, $R_2$ may also be hydrogen, $R_3$ higher alkyls between 8 and 20 carbon atoms, and $R_4$ such groups as lower alkyl, lower alkoxy, nitro, chlorine, bromine and the like.

The compounds according to the invention are effective against a series of phytopathogenic fungi, of which Phytophthora infestans
Alternaria solani
Plasmopara viticola
Venturi inaequalis are principally to be mentioned, without thereby limiting the action of these fungi.

EXAMPLES

The fungicidal activity of the compounds to be used according to the invention are illustrated by way of example by 1-methyl-3-dodecyl-benzimidazolium salts and Phytophthora infestans:

Young tomato plants (Bonny Best) are sprayed with aqueous emulsions formed by mixing the active ingredient of the preparations in the stated concentrations. Auxiliary solvents (equal parts) such as dimethyl formamide, chlorobenzene, acetone and the like are useful to prepare these emulsions and a non-ionic emulsifier of the type arylhydroxypolyglycolether may be used, too, advantageously. 24 hours later, when the plants have dried off, they are placed in a moisture chamber and inoculated by sprinkling over with zoospores of *Phytophthora infestans*. The plants remain until evaluation on the sixth day after inoculation in the moisture chamber at 18°–20° C. and a relative humidity of 98% to 100%. The casualty rate of the treated plants is given in percent of the casualty rate of the untreated controls whose casualty rate is taken as 100. Untreated plants are at the moment of evaluation completely destroyed by the fungus.

Table 1.—Phytophthora infestans/*tomatoes*

| Preparation | Casualty rate at preparation concentrations in percent | | |
|---|---|---|---|
| | 0.025 | 0.0125 | 0.00625 |
| [benzimidazole-$C_{12}H_{25}$, $CH_3$, CH]$^+$ Br$^-$ | 15 | 32 | 42 |
| [benzimidazole-$C_{12}H_{25}$, $CH_3$, CH]$^+$ [NO$_2$-C$_6$H$_3$(NO$_2$)-SO$_3$]$^-$ | 41 | | |
| {[benzimidazole-$C_{12}H_{25}$, $CH_3$, CH]$^+$}$_3$ [Fe(CN)$_6$]$^{3-}$ | 13 | | 33 |
| {[benzimidazole-$C_{12}H_{25}$, $CH_3$, C-CH$_3$]$^+$}$_3$ [Fe(CN)$_6$]$^{3-}$ | 6 | | 36 |
| Untreated control | | | 100 |

The compounds useful according to this invention can be sprayed in a dispersed or emulsified form or also be applied in dry form or as dusts. In the case of application as a spraying medium they are ground with suitable wetting and dispersing agents in the presence of inert materials (such as kaolin, talc or similar substances) or, together with emulsifiers, dissolved in suitable solvents.

Their continued application with other (even inorganic) fungicides and/or insecticides is possible.

We claim:

1. A method for protecting plants against fungicidal attack comprising treating the plants with a salt of 1-lower alkyl-3-higher alkylbenzimidazole of the following formula:

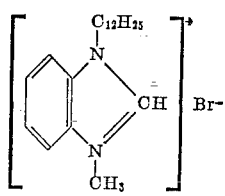

2. A method for protecting plants against fungicidal attack comprising treating the plants with a salt of 1-lower alkyl-3-higher alkylbenzimidazole of the following formula:

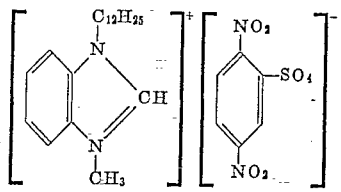

3. A method for protecting plants against fungicidal attack comprising treating the plants with a salt of 1-lower alkyl-3-higher alkylbenzimidazole of the following formula:

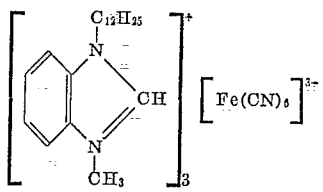

4. A method for protecting plants against fungicidal attack comprising treating the plants with a salt of 1-lower alkyl-3-higher alkylbenzimidazole of the following formula:

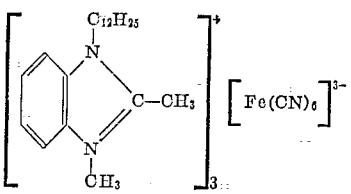

5. A method for protecting plants against fungicidal attack comprising treating the plants with a salt of 1-lower alkyl-3-higher alkyl-benzimidazole having the following formula:

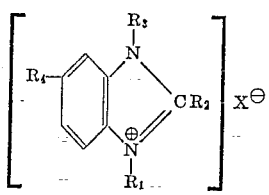

in which $R_1$ stands for a lower alkyl radical having up to 4 carbon atoms; $R_2$ stands for a member selected from the group consisting of hydrogen and lower alkyl radical having up to 4 carbon atoms; $R_3$ stands for a higher alkyl radical having from 8 to 20 carbon atoms; $R_4$ stands for a member selected from the group consisting of hydrogen, lower alkyl, lower alkoxy, chlorine, and nitro; and X is a salt-forming anion selected from the group consisting of chloride, bromide, sulfate, nitrate, hexacyanoferrate, reineckate, naphthalene-1,5-disulfonate, nitrophenyl-sulfonate, di-nitrophenyl-sulfonate, pentachlorophenate, 2-mercapto-benzomidazolate and 2-mercapto-benzothiazolate.

6. A fungicidal composition comprising (a) A salt of a 1-lower alkyl-3-higher alkyl-benzimidazole of the following formula:

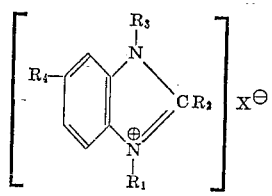

in which $R_1$ stands for lower alkyl radicals having up to 4 carbon atoms; $R_2$ stands for a member selected from the group consisting of hydrogen and lower alkyl radicals having up to 4 carbon atoms; $R_3$ stands for a higher alkyl radical having from 8 to 20 carbon atoms; $R_4$ stands for a member selected from the group consisting of hydrogen, lower alkyl, lower alkoxy, chlorine, and nitro; and X is a salt-forming ion selected from the group consisting of chloride, bromide, sulfate, nitrate, hexacyanoferrate, reineckate, naphthalene-1,5-disulfonate, nitrophenyl-sulfonate, di-nitrophenyl-sulfonate pentachlorophenate, 2-mercapto-benzimidazolate, 2-mercapto-benzothiazolate, (b) a non-ionic emulsifier, (c) water, and (d) an auxiliary solvent selected from the group consisting of dimethyl formamide, chlorobenzene and acetone.

References Cited in the file of this patent

UNITED STATES PATENTS

| | | |
|---|---|---|
| 2,782,204 | Tenenbaum | Feb. 19, 1957 |
| 2,876,233 | Herrling et al. | Mar. 3, 1959 |

FOREIGN PATENTS

| | | |
|---|---|---|
| 535,065 | Belgium | Nov. 21, 1958 |
| 601,091 | Canada | July 5, 1960 |